J. L. BURNHAM.
ARC BARRIER FOR DYNAMO-ELECTRIC MACHINES.
APPLICATION FILED JAN. 7, 1922.

1,423,996.

Patented July 25, 1922.

Inventor:
Joseph L. Burnham, by Albert G. Davis
His Attorney.

UNITED STATES PATENT OFFICE.

JOSEPH L. BURNHAM, OF SCHENECTADY, NEW YORK, ASSIGNOR TO GENERAL ELECTRIC COMPANY, A CORPORATION OF NEW YORK.

ARC BARRIER FOR DYNAMO-ELECTRIC MACHINES.

1,423,996.   Specification of Letters Patent.   Patented July 25, 1922.

Application filed January 7, 1922. Serial No. 527,700.

*To all whom it may concern:*

Be it known that I, JOSEPH L. BURNHAM, a citizen of the United States, residing at Schenectady, in the county of Schenectady, State of New York, have invented certain new and useful Improvements in Arc Barriers for Dynamo-Electric Machines, of which the following is a specification.

My invention relates to arc barriers or deflectors for use on dynamo electric machines, or the like, provided with commutators. When an arc occurs under a commutator brush on such machines, it establishes a short circuit between adjacent commutator bars which spreads until the arc extends from the brush under which it started to the next adjacent set of brushes, or to a part of the machine of opposite polarity, or to ground. My invention has for its object a novel construction of an arc barrier for preventing such spreading of arcs produced under the brushes of direct current machines.

Figure 1:
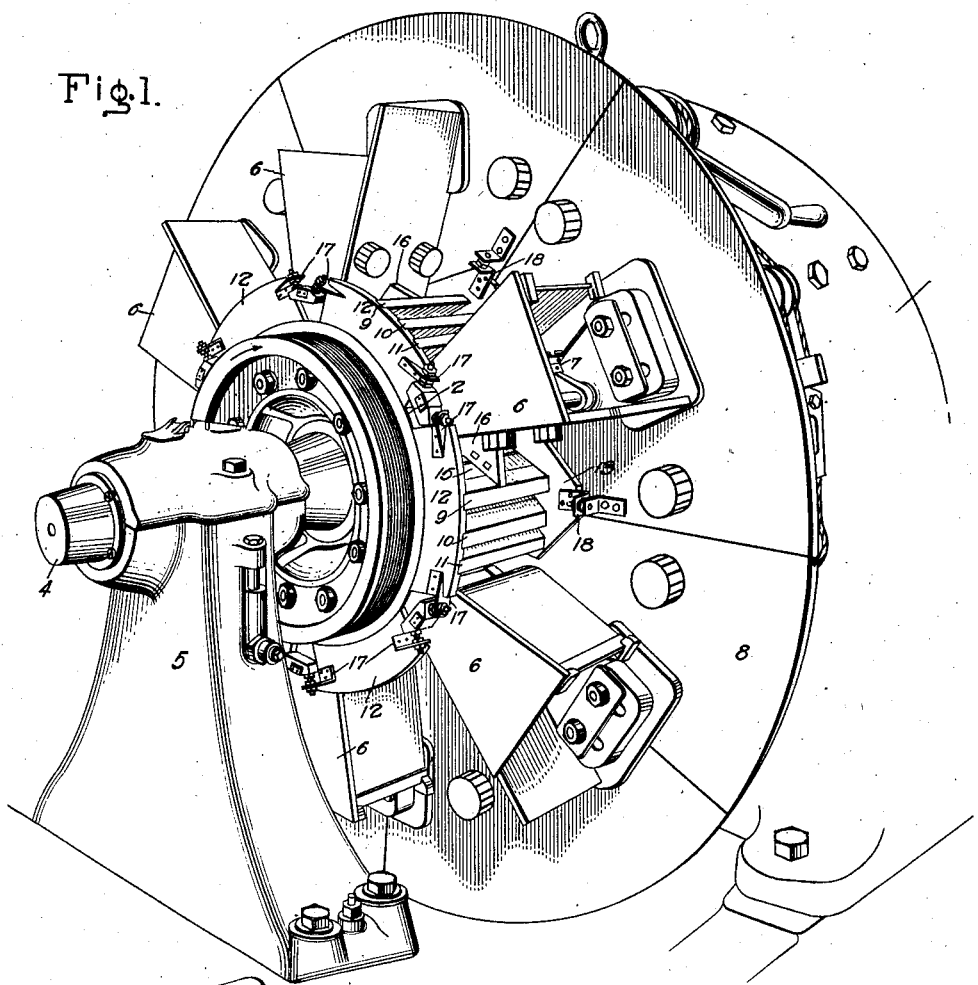
Figure 2:
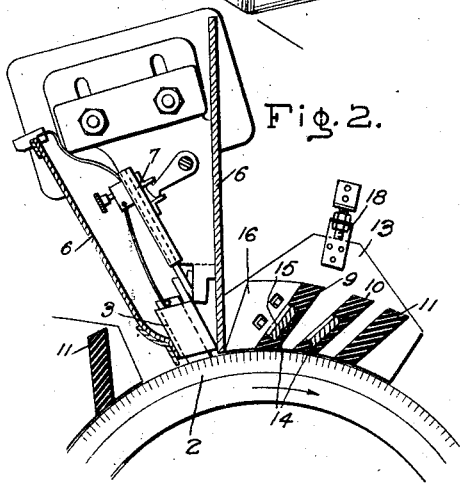
Figure 3:
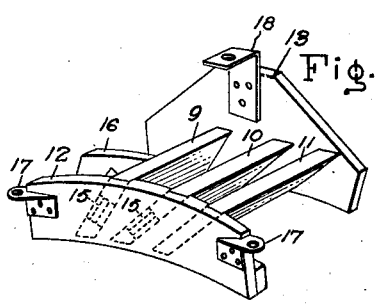

The various features of novelty which characterize my invention are pointed out with particularity in the claims annexed to and forming a part of this specification. For a better understanding of my invention, reference may be had to the following description taken in connection with the accompanying drawing, in which Figure 1 is a perspective view of a direct current machine provided with my invention; Fig. 2 is a sectional view of a portion of the direct current machine of Fig. 1; and Fig. 3 is a perspective view of my arc barrier.

In Fig. 1 of the drawing there is shown the commutator end of a dynamo electric machine, which may be either a generator or motor of the direct or alternating current type, or a rotary converter. 1 is the frame of the machine, 2 is the commutator on which sets of brushes 3 bear. The armature of the machine with the commutator 2 is mounted on a shaft 4 which is shown as journaled in a bearing 5. The direction in which the armature is intended to rotate is indicated by an arrow in both Figs. 1 and 2. The sets of brushes 3 are enclosed in box like frames 6 made of insulating material to protect the brush rigging 7 from any arcs occurring under the brushes, and a sectional circular member 8 fastened to the brush holder yoke similarly protects the bus rings and armature. These insulating members form no part of my new barrier.

One feature of my new invention comprises a plurality of members 9, 10 and 11 of insulating material mounted so as to be in close proximity to the commutator 2 and inclined thereto at an obtuse angle having reference to the direction of rotation of the commutator. These members 9, 10 and 11 are preferably pointed so that they act as a scoop to lift the arc occurring under the brushes 3 from the commutator. The inclination of the member 9 forms an expansion chamber for the hot gases produced by the arcing of the brushes. This expansion chamber cools the gases and extinguishes the arc. I have also shown the member 10 inclined to the commutator at a greater obtuse angle than the member 9, thus forming a second expansion chamber for any gases or arc which may pass under the first member 9. I have found that by the use of a plurality of insulating members that such members need be only high enough to lift the arc from the commutator, but need not be so high as those used heretofore, with consequently less danger of the pressure of the gases building up and blowing out under the side members 12 and 13 of the barrier or under the clearance between the commutator and the members 9, 10 and 11 of the barrier.

Another feature of my barrier comprises metal members 14 mounted in the front surface of one or more of the insulating members 9 or 10. By the front surface of the members 9 and 10, I mean the surface which is toward the set of brushes 3 in front of which the barrier is located having reference to the direction of rotation of said commutator. These metal members 14 are shown in the form of plates embedded in the insulating members 9 and 10, but having their surfaces 15 exposed so that the arc from the brushes can come into contact with these surfaces. These metal members absorb some of the heat of the arc and the gases formed thereby and thereby cool them. I have shown these metal members mounted in the two insulating members 9 and 10. It may be found desirable under certain conditions to mount them in all of the insulating members, and under other conditions to mount them in only the first member 9. Furthermore, this metal member 14 may be used in a barrier comprising only one insulating member 9.

Another new feature of my barrier comprises an arc splitter 16, made of insulating material. The arc splitter 16 is located between the ends of the member 9 and extends at substantially right angles thereto and at substantially right angles to the commutator 2. As shown in the drawing, it also extends toward the set of brushes 3 in front of which the barrier is located having reference to the direction of rotation of the commutator. It has beeen found in practice that the arc occurring under a set of brushes tends to crowd toward one end of the commutator, usually the outer end, thereby causing the arcing to be more severe at this point. By providing the arc splitter 16, the arc is split up and prevented from crowding to the end of the commutator. I have found that in very short commutators the arc splitter may be dispensed with. With long commutators, however, one or more arc splitters spaced at intervals across the commutator are advantageously used. Furthermore, the arc splitter may be used in a barrier comprising only one insulating member 9.

The members 9, 10 and 11 are mounted between the side members 12 and 13, and the whole barrier is shown as removably mounted between adjacent sets of brushes. The members 12 are provided with lugs 17 by means of which the barrier is fastened to the frames 6. The members 13 are provided with lugs 18 by means of which the barrier is fastened to the shield or member 8. The fastening means for the lugs 17 and 18 are bolts provided with two nuts as shown, whereby the barrier may be adjusted so that the clearance between it and the commutator may be made any amount desired and also permits the ready removal of the barrier from the machine if desired.

Although I have found it advantageous to use all of the features described above in a single barrier, I desire it to be understood that my invention is not limited to their combined use, but that each of the features may be used separately under certain conditions.

What I claim as new and desire to secure by Letters Patent of the United States is:—

1. In combination, a commutator, sets of brushes therefor, and arc barriers located between adjacent sets of brushes, each of said barriers comprising a member of insulating material mounted so as to be in close proximity to said commutator and inclined thereto at an obtuse angle having reference to the direction of rotation of the commutator, and an arc splitter of insulating material located between the ends of such first mentioned member and extending at substantially right angles thereto and at substantially right angles to said commutator and toward said set of brushes in front of which said barrier is located having reference to the direction of rotation of said commutator.

2. In combination, a commutator, sets of brushes therefor, and arc barriers located between adjacent sets of brushes, each of said barriers comprising a member of insulating material mounted so as to be in close proximity to said commutator and inclined thereto at an obtuse angle having reference to the direction of rotation of the commutator, and a metal member mounted in the front surface of said insulating member having reference to the direction of rotation of said commutator.

3. In combination, a commuator, sets of brushes therefor, and arc barriers located between adjacent sets of brushes, each of said barriers comprising a pointed member of insulating material mounted so as to be in close proximity to said commutator and inclined thereto at an obtuse angle having reference to the direction of rotation of the commutator, a metal member in the front surface of said insulating member having reference to the direction of rotation of said commutator, and an arc splitter of insulating material located between the ends of said member of insulating material and extending at substantially right angles thereto and at substantially right angles to said commutator and toward said second set of brushes in front of which said barrier is located having reference to the direction of rotation of said commutator.

4. In combination, a commutator, sets of brushes therefor, and arc barriers located between adjacent sets of brushes, each of said barriers comprising a plurality of members of insulating material mounted so as to be in close proximity to said commutator, said members being inclined thereto at an obtuse angle having reference to the direction of rotation of the commutator.

5. In combination, a commutator, sets of brushes therefor, and arc barriers located between adjacent sets of brushes, each of said barriers comprising a plurality of pointed members of insulating material mounted so as to be in close proximity to said commutator, said members being inclined thereto at an obtuse angle having reference to the direction of rotation of the commutator, and an arc splitter of insulating material located between the ends of that one of said members of insulating material toward said set of brushes in front of which said barrier is located having reference to the direction of rotation of said commutator and extending at substantially right angles thereto and at substantially right angles to said commutator and toward said set of brushes in front of which said barrier is located having reference to the direction of rotation of said commutator.

6. In combination, a commutator, sets of brushes therefor, and arc barriers located between adjacent sets of brushes, each of said barriers comprising a plurality of pointed members of insulating material mounted so as to be in close proximity to said commutator, said members being inclined thereto at an obtuse angle having reference to the direction of rotation of the commutator, and a metal member mounted in the front surface of that one of said insulating members which is toward said set of brushes in front of which said barrier is located having reference to the direction of rotation of said commutator.

7. In combination, a commutator, sets of brushes therefor, and arc barriers located between adjacent sets of brushes, each of said barriers comprising a plurality of pointed members of insulating material mounted so as to be in close proximity to said commutator, said members being inclined thereto at an obtuse angle having reference to the direction of rotation of the commutator, an arc splitter of insulating material located between the ends of that one of said members of insulating material toward said set of brushes in front of which said barrier is located having reference to the direction of rotation of said commutator and extending at substantially right angles thereto and at substantially right angles to said commutator and toward said set of brushes in front of which said barrier is located having reference to the direction of rotation of said commutator, and a metal member mounted in the front surface of that one of said insulating members which is toward said set of brushes in front of which said barrier is located having reference to the direction of rotation of said commutator.

8. In combination, a commutator, sets of brushes therefor, and arc barriers located between adjacent sets of brushes, each of said barriers comprising a plurality of members of insulating material mounted so as to be in close proximity to said commutator, said members being inclined thereto at an obtuse angle having reference to the direction of rotation of the commutator, said members having different inclinations to said commutator and forming an expansion chamber for the gas formed by arcing produced under said brushes.

9. In combination, a commutator, sets of brushes therefor, and arc barriers located between adjacent sets of brushes, each of said barriers comprising a plurality of members of insulating material mounted so as to be in close proximity to said commutator, one of said members being inclined to said commutator at an obtuse angle with reference to the direction of rotation of said commutator, and the second of said members being inclined to said commutator at a greater obtuse angle with reference to the direction of rotation of said commutator than said first mentioned member.

10. In combination, a commutator, sets of brushes therefor, and arc barriers located between adjacent sets of brushes, each of said barriers comprising a plurality of pointed members of insulating material mounted so as to be in close proximity to said commutator, said members being inclined thereto at an obtuse angle having reference to the direction of rotation of the commutator, said members having different inclinations to said commutator and forming an expansion chamber for the gas formed by arcing produced under said brushes, and a metal member mounted in the front surface of that one of said insulating members which is toward said set of brushes in front of which said barrier is located having reference to the direction of rotation of said commutator.

11. In combination, a commutator, sets of brushes therefor, and arc barriers located between adjacent sets of brushes, each of said barriers comprising a plurality of pointed members of insulating material mounted so as to be in close proximity to said commutator, said members being inclined thereto at an obtuse angle having reference to the direction of rotation of the commutator, said members having different inclinations to said commutator and forming an expansion chamber for the gas formed by arching produced under said brushes, and an arc splitter of insulating material located between the ends of that one of said members of insulating material toward said set of brushes in front of which said barrier is located having reference to the direction of rotation of said commutator and extending at substantially right angles thereto and at substantially right angles to said commutator toward said set of brushes in front of which said barrier is located having reference to the direction of rotation of said commutator.

12. In combination, a commutator, sets of brushes therefor, and arc barriers located between adjacent sets of brushes, each of said barriers comprising a plurality of pointed members of insulating material mounted so as to be in close proximity to said commutator, said members being inclined thereto at an obtuse angle having reference to the direction of rotation of the commutator, said members having different inclinations to said commutator and forming an expansion chamber for the gas formed by arcing produced under said brushes, and an arc splitter of insulating material located between the ends of that one of said members of insulating material toward said set of brushes in front of which said barrier is located having reference to the direction of rotation of said commutator and extending at substantially right angles thereto and at substantially right angles to said commutator toward said set of brushes in front of which said barrier is located having reference to the direction of rotation of said commutator, and a metal member mounted in the front surface of that one of said insulating members which is toward said set of brushes in front of which said barrier is located having reference to the direction of rotation of said commutator.

13. In combination, a commutator, sets of brushes therefor, and arc barriers located between adjacent sets of brushes, each of said barriers comprising a plurality of pointed members of insulating material mounted so as to be in close proximity to said commutator, one of said members being inclined to said commutator at an obtuse angle with reference to the direction of rotation of said commutator, and the second of said members being inclined to said commutator at a greater obtuse angle with reference to the direction of rotation of said commutator than said first mentioned member, and an arc splitter of insulating material located between the ends of said first mentioned insulating member and extending at substantially right angles thereto and at substantially right angles to said commutator and toward said set of brushes in front of which said barrier is located having reference to the direction of rotation of said commutator.

14. In combination, a commutator, sets of brushes therefor, and arc barriers located between adjacent sets of brushes, each of said barriers comprising a plurality of pointed members of insulating material mounted so as to be in close proximity to said commutator, the said member located in front of said set of brushes having reference to the direction of rotation of said commutator being inclined to said commutator at an obtuse angle with reference to the direction of rotation of said commutator, the second of said members being inclined to said commutator at a greater obtuse angle with reference to the direction of rotation of said commutator than said first mentioned member, and a metal member mounted in the front surface of the front one of said insulating members.

15. In combination, a commutator, sets of brushes therefor, and arc barriers located between adjacent sets of brushes, each of said barriers comprising a plurality of pointed members of insulating material mounted so as to be in close proximity to said commutator, the said member located in front of said set of brushes having reference to the direction of rotation of said commutator being inclined to said commutator at an obtuse angle with reference to the direction of rotation of said commutator, the second of said members being inclined to said commutator at a greater obtuse angle with reference to the direction of rotation of said commutator than said first mentioned member, a metal member mounted in the front surface of the front one of said insulating members, and an arc splitter of insulating material located between the ends of the front one of said insulating members and extending at substantially right angles thereto and at substantially right angles to said commutator and toward said set of brushes in front of which said barrier is located having reference to the direction of rotation of said commutator.

In witness whereof, I have hereunto set my hand this 6th day of January, 1922.

JOSEPH L. BURNHAM.